United States Patent
Kusudou et al.

(10) Patent No.: US 7,056,977 B2
(45) Date of Patent: Jun. 6, 2006

(54) POLYVINYL ACETAL AND ITS USE

(75) Inventors: Takeshi Kusudou, Kurashiki (JP);
Yousuke Kumaki, Kurashiki (JP);
Naoki Fujiwara, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 268 days.

(21) Appl. No.: 10/624,588

(22) Filed: Jul. 23, 2003

(65) Prior Publication Data

US 2004/0122167 A1    Jun. 24, 2004

(30) Foreign Application Priority Data

Jul. 23, 2002  (JP) ............................. 2002-214093
Jul. 23, 2002  (JP) ............................. 2002-214095

(51) Int. Cl.
*C08F 8/00*    (2006.01)
*C08G 63/48*   (2006.01)
*C08G 63/91*   (2006.01)

(52) U.S. Cl. ................. 525/61; 428/524; 428/437
(58) Field of Classification Search ............ 525/61
See application file for complete search history.

(56) References Cited

U.S. PATENT DOCUMENTS 6,472,470 B1 * 10/2002 Fujiwara et al. ............. 525/61
6,586,103 B1 * 7/2003 Shohi et al. ................. 428/437
2004/0157078 A1 * 8/2004 Yoshida ....................... 428/524

FOREIGN PATENT DOCUMENTS

| EP | 0 124 782   | 11/1984 |
| EP | 0 368 832   | 5/1990  |
| EP | 0 634 447   | 1/1995  |
| EP | 0 950 696   | 10/1999 |
| EP | 0 987 280   | 3/2000  |
| EP | 1 008 605   | 6/2000  |
| EP | 1 099 6672  | 5/2001  |
| JP | 11-349889   | 12/1999 |
| JP | 2000-503341 | 3/2000  |
| WO | WO 92/13903 | 8/1992  |
| WO | WO 02/059167 | 8/2002 |

* cited by examiner

*Primary Examiner*—David W. Wu
*Assistant Examiner*—Ives Wu
(74) *Attorney, Agent, or Firm*—Oblon, Spivak, McClelland, Maier & Neustadt, P.C.

(57) ABSTRACT

The invention provides a polyvinyl acetal having a degree of acetalization of from 45 to 80 mol %, which is obtained through acetalization of a polyvinyl alcohol having a degree of polymerization of from 30 to 1000 and a degree of hydrolysis of from 80.0 to 99.99 mol % and having a specific amount of an ionic group bonded to the terminal thereof via a sulfido bond. The polyvinyl acetal of the invention is useful for binders for ceramic forming and for binders for ink or paint.

8 Claims, No Drawings

POLYVINYL ACETAL AND ITS USE

BACKGROUND OF THE INVENTION

1. Field of the Invention

The present invention relates to a polyvinylacetal. More precisely, the invention relates to a polyvinyl acetal obtained through acetalization of a polyvinyl alcohol terminated with an ionic group via a sulfido bond, and to its use.

2. Description of the Related Art

It has been known since long ago that polyvinyl acetal is obtained by acetalyzing polyvinyl alcohol with an aldehyde compound under an acidic condition. Polyvinyl alcohol generally has vinyl alcohol units and vinyl ester units. Therefore, polyvinyl acetal obtained through acetalization of such polyvinyl alcohol comprises at least three types of monomer units that include vinyl acetal units in addition to the two types of monomer units of the starting polyvinyl alcohol. Recently, many different types of polyvinyl alcohol have been proposed, and many different types of polyvinyl acetal have been known by combining such different types of polyvinyl alcohol with various types of aldehyde.

Above all, polyvinyl formal to be produced from polyvinyl alcohol and formaldehyde, polyvinyl acetal to be produced from polyvinyl alcohol and acetaldehyde, and polyvinyl butyral to be produced from polyvinyl alcohol and butylaldehyde stand the essential situation in trade.

In particular, polyvinyl butyral is much used not only for interlayer films for windowpanes for automobiles and buildings but also in other various industrial fields of binder for ceramic forming, photosensitive materials, dispersant for ink, etc. In the field of binder for ceramic forming in industrial applications, polyvinyl acetal is used, for example, as a forming binder in the process of producing ceramic laminate capacitors or producing ceramic substrates for electronic circuits. In particular, polyvinyl acetal is much used as a binder in producing ceramic green sheets.

These days, in particular, precision electric appliances such as mobile phones and notebook-size personal computers are desired to be small-sized and lightweight, and small-sized, electric and electronic parts of good performance are desired for these.

For example, small-sized, large-capacity ceramic laminate capacitors are desired for ceramic laminate capacitors, for which various methods have been tried for more reducing the thickness of the electrode part or the ceramic part and for further increasing the capacity. From the technical viewpoint, it is a matter of importance to thin the ceramic green sheets for them. For reducing the thickness of the sheets, ceramic powder having a small particle size must be used as the starting material. However, ceramic powder having such a reduced particle size shall have an increased surface area and will therefore readily aggregate. Accordingly, the ceramic powder of the type causes some problems in that the surface of the ceramic green sheets formed of it is often roughened, homogeneous ceramic green sheets are difficult to obtain, and the mechanical strength of thin sheets is low. At present, these problems could not be satisfactorily solved by the polyvinyl acetal heretofore known in the art.

In the paint field of its industrial applications, polyvinyl acetal is used for paint for automobiles, baking enamel, shop primer, wash primer, adhesive lacquer, insulating coat on tar or nicotine, paint for plastics, nitrocellulose lacquer, paper varnish, etc. For binder for printing ink for wrapping or packaging materials, used is polyvinyl butyral of low solution viscosity. The printing ink that comprises the polymer well adheres to organic and inorganic substrates and is therefore suitable for prints on polyolefin films, metal foil, cellulose acetate films, polyamide films and polystyrene films.

These days, in particular, printers are driven at high speed in many cases. Therefore, for realizing such high-speed driving of printers, it is said that the printing ink must have a high pigment content at its desired viscosity, and, even if the printed ink film is thin, the print color intensity must be high. In general, for increasing the pigment content of printing ink, it is important to lower the solution viscosity thereof. For lowering the solution viscosity of printing ink, use of polyvinyl acetal having a low degree of polymerization may be taken into consideration. However, using polyvinyl acetal of low polymerization, which is produced through acetalization of completely hydrolyzed polyvinyl alcohol, is problematic in that the aqueous solution of the polyvinyl acetal readily gels and the pigment content of ink with the polymer could not increase.

To solve these problems, for example, proposed are a method of using polyvinyl butyral produced from polyvinyl alcohol having a specific degree of hydrolysis (as in JP-A 11-349889), and a method of using polyvinyl acetal produced from polyvinyl alcohol having 1-alkylvinyl alcohol units and 1-alkylvinyl acetate units (as in JP-T 2000-503341—the term "JP-T" as used herein means a published Japanese translation of a PCT application). These methods may be effective in some degree for solving the problems as above, but could not always lead to satisfactory results.

SUMMARY OF THE INVENTION

An object of the invention is to provide a polyvinyl acetal suitable for binder for ceramic forming, which enables production of homogeneous ceramic green sheets of high mechanical strength even when ceramic powder having a small particle size is used for producing thin ceramic green sheets.

Another object of the invention is to provide a novel polyvinyl acetal having a low solution viscosity but having a high solid content (that is, having a high pigment content) and is suitable for production of ink or paint of good colorant dispersibility.

We, the present inventors have assiduously studied for attaining the objects as above, and, as a result, have found that the objects can be attained by a polyvinyl acetal that starts from a specific polyvinyl alcohol. On the basis of this finding, we have completed the present invention.

Specifically, the first aspect of the invention is a polyvinyl acetal having a degree of acetalization of from 45 to 80 mol %, which is obtained through acetalization of a polyvinyl alcohol that has a degree of polymerization of from 30 to 1000 and a degree of hydrolysis of from 80.0 to 99.99 mol % and is terminated with an ionic group via a sulfido bond while satisfying the requirement of the following formula (1):

$$0.15 \leq \text{content} \leq 218.3 \times P^{-1.046} \quad (1)$$

wherein the content means the content of the ionic group bonded to the polyvinyl alcohol via a sulfido bond (mol %); and P indicates the degree of polymerization of the polyvinyl alcohol.

The second aspect of the invention is a polyvinyl acetal composition that contains (A) the polyvinyl acetal of the first aspect of the invention and (B) a polyvinyl acetal having a degree of acetalization of from 45 to 80 mol % and obtained through acetalization of a polyvinyl alcohol having a degree of polymerization of from 100 to 4000 and a degree of hydrolysis of from 80.0 to 99.99 mol %, in a ratio by weight of $5/95 \leq (A)/(B) \leq 100/0$.

The third aspect of the invention is a binder for ceramic forming, which comprises, as the essential ingredient thereof, the polyvinyl acetal of the first aspect of the invention or the polyvinyl acetal composition of the second aspect of the invention. The binder for ceramic forming of the third aspect of the invention makes it possible to produce homogeneous ceramic green sheets of high mechanical strength even when ceramic powder having a small particle size is used as the starting material.

The fourth aspect of the invention is a binder for ink and paint, which comprises, as the essential ingredient thereof, the polyvinyl acetal of the first aspect of the invention or the polyvinyl acetal composition of the second aspect of the invention. The binder for ink and paint of the fourth aspect of the invention makes it possible to produce ink and paint of good colorant dispersibility, which has a low solution viscosity and a high solid content (that is, a high pigment content).

DESCRIPTION OF THE PREFERRED EMBODIMENTS

The polyvinyl acetal of the invention is produced through acetalization of a polyvinyl alcohol having a degree of polymerization of from 30 to 1000 and a degree of hydrolysis of from 80.0 to 99.99 mol % and terminated with an ionic group via a sulfido bond while satisfying the requirement of the following formula (1):

$$0.15 \leq \text{content} \leq 218.3 \times P^{-1.046} \quad (1)$$

wherein the content means the content of the ionic group bonded to the polyvinyl alcohol via a sulfido bond (mol %); and P indicates the degree of polymerization of the polyvinyl alcohol.

The polyvinyl alcohol (hereinafter abbreviated as "PVA") that is used for producing the polyvinyl acetal in the invention has a degree of polymerization of from 30 to 1000.

When the polyvinyl acetal of the invention is used for binders for ceramic forming, the degree of polymerization of PVA for it is preferably from 30 to 1000, more preferably from 50 to 850, even more preferably from 100 to 700. If the degree of polymerization of PVA is smaller than 30, PVA of the type will be difficult to produce on an industrial scale; but if larger than 1000, the ceramic green sheets fabricated by the use of the polyvinyl acetal from PVA of the type could not be homogeneous.

When the polyvinyl acetal of the invention is used for binders for ink or paint, the degree of polymerization of PVA for it is preferably from 30 to 1000, more preferably from 30 to 700, even more preferably from 50 to 600, still more preferably from 100 to 550. If the degree of polymerization of PVA is smaller than 30, PVA of the type will be difficult to produce on an industrial scale; but if larger than 1000, ink or paint having a low solution viscosity and a high solid content (high pigment content) will be difficult to produce.

In the invention, the degree of polymerization of PVA means a viscosity-average degree of polymerization thereof, and it is measured according to JIS-K6726. Concretely, PVA is hydrolyzed to a degree of hydrolysis of at least 99.5 mol %, and purified, and its degree of polymerization is derived from the intrinsic viscosity [α] thereof measured in water at 30° C., according to the following equation:

$$P = ([\eta] \times 1000/8.29)^{(1/0.62)}$$

PVA to be the starting material for the polyvinyl acetal of the invention must have a degree of hydrolysis of from 80.0 to 99.99 mol %.

When the polyvinyl acetal of the invention is used for binders for ceramic forming, the degree of hydrolysis of PVA for it is preferably from 80.0 to 99.99 mol %, more preferably from 85 to 99.5 mol %, even more preferably from 90 to 99 mol %, still more preferably from 92 to 98.5 mol %. If the degree of hydrolysis of PVA is smaller than 80 mol %, the ceramic green sheets obtained by the use of the polyvinyl acetal binder could not be homogeneous; but if the degree of hydrolysis thereof is larger than 99.99 mol %, PVA of the type will be difficult to produce.

When the polyvinyl acetal of the invention is used for binders for ink or paint, the degree of hydrolysis of PVA for it is preferably from 80.0 to 99.99 mol %, more preferably from 85 to 99.5 mol %, even more preferably from 90 to 99 mol %, still more preferably from 92 to 98.5 mol %. If the degree of hydrolysis of PVA is smaller than 80 mol %, ink or paint having a low solution viscosity and a high solid content (high pigment content) will be difficult to obtain; but if the degree of hydrolysis thereof is 99.99 mol %, PVA of the type will be difficult to produce.

In PVA that is used for the starting material for the polyvinyl acetal of the invention, the content of the terminal ionic group bonded to PVA via a sulfido bond must be at least 0.15 mol % and must be at most $(218.3 \times P^{-1.046})$ mol % in which P indicates the degree of polymerization of PVA.

If the content of the ionic group in PVA is smaller than 0.15 mol % and when polyvinyl acetal from PVA of the type is used as a binder for ceramic forming, then the ceramic green sheets formed could not be homogeneous. When the polyvinyl acetal is used as a binder for ink or paint, then ink or paint having a low solution viscosity and a high solid content (high pigment content) will be difficult to produce. On the other hand, if the mean content of the ionic group in PVA is larger than $(218.3 \times P^{-1.046})$ mol % in which P indicates the degree of polymerization of PVA and when polyvinyl acetal from PVA of the type is used as a binder for ceramic forming, then the ceramic green sheets formed could not be homogeneous and the mechanical strength of the sheets may be low. When the polyvinyl acetal is used as a binder for ink or paint, then it will be ineffective for lowering the solution viscosity of the ink or paint produced and for increasing the solid content (that is, increasing the pigment content) thereof.

The ionic group includes anionic groups such as carboxyl groups, carboxylate salts, sulfonic groups, sulfonate salts, phosphoric groups, phosphate salts; and cationic groups such as those of ammonium salts of primary to tertiary amines, and quaternary ammonium salts. Of those, preferred are carboxyl groups, sulfonic groups, and their alkali metal salts and ammonium salts.

The terminal structure of PVA for use in the invention may be represented as follows:

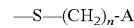

wherein n indicated an integer of from 1 to 10; A represents —COOX or —SO$_3$X; and X represents a hydrogen atom, an alkali metal or NH$_4$.

The content of the ionic group bonded to the terminal of PVA via a sulfido bond may be obtained from the peaks in proton NMR of PVA. Concretely, PVA is hydrolyzed to a degree of hydrolysis of at least 99.95 mol %, well washed with methanol, and then dried at 90° C. under reduced pressure for 2 days to prepare a sample for analysis, then this is subjected to proton NMR with a solvent of DMSO-d6. From the peak (at 2.6 to 2.8 ppm) derived from the methylene that bonds to the sulfur atom in PVA, the content of the ionic group in PVA is calculated.

The content of the ionic group bonded to the terminal of PVA via a sulfido bond does not vary even in acetalization of PVA. Accordingly, the polyvinyl acetal of the invention contains the same amount of an ionic group bonded to its terminal via a sulfido bond as that in the starting PVA for it.

The content of the ionic group bonded to the terminal of the polyvinyl acetal of the invention via a sulfido bond may be obtained also from the peaks in proton NMR of the polymer. Concretely, a sample for analysis is prepared from the polyvinyl acetal, and this is subjected to proton NMR with a solvent of DMSO-d6 or methanol-d4. From the peak (at 2.6 to 2.8 ppm) derived from the methylene that bonds to the sulfur atom in the polymer, the ionic group content of the polymer is calculated.

Another method of measuring the ionic group content of the polyvinyl acetal is as follows: The polymer is reacted with a hydroxylamine hydrochloride in an alcohol solvent, the resulting reaction product is well reprecipitated and purified in water/alcohol to be PVA, the resulting PVA is hydrolyzed to a degree of hydrolysis of at least 99.95 mol %, and this is dried to prepare a sample for analysis. The sample thus prepared is subjected to proton NMR with a solvent of DMSO-d6 to calculate the ionic group content of the polymer.

Preferably, the starting PVA for the polyvinyl acetal of the invention contains from 1 to 2 mol % of a 1,2-glycol bond, and satisfies the following formula (2):

$$0.15 \leq \text{content} \leq -0.0606 \times Y + 2.3049 \qquad (2)$$

wherein the content means the content (mol %) of the ionic group bonded to PVA via a sulfido bond; and Y indicates a 1,2-glycol bond content of PVA.

When the 1,2-glycol bond content of PVA is smaller than 1 mol % or larger than 2 mol % and if the polyvinyl acetal from PVA of the type is used as a binder for ceramic forming, then the ceramic green sheets produced could not be homogeneous and the mechanical strength of the sheets may lower. When the polyvinyl acetal is used as a binder for ink or paint, it will be ineffective for lowering the solution viscosity of the ink or paint or for increasing the solid content (that is, increasing the pigment content) thereof.

When the mean content of the ionic group in PVA is larger than (−0.0606×Y+2.3049) mol % where Y is the 1,2-glycol bond content of PVA and when the polyvinyl acetal from PVA of the type is used as a binder for ceramic forming, then the ceramic green sheets produced could not be homogeneous and the mechanical strength of the sheets may lower. When the polyvinyl acetal is used as a binder for ink or paint, it will be ineffective for lowering the solution viscosity of the ink or paint or for increasing the solid content (that is, increasing the pigment content) thereof.

In the invention, the 1,2-glycol bond content of PVA may be obtained from the peaks in NMR. Concretely, PVA is hydrolyzed to a degree of hydrolysis of at least 99.9 mol %, then fully washed with methanol, and then dried at 90° C. under reduced pressure for 2 days to prepare a sample for analysis. The sample is dissolved in DMSO-D6, some drops of trifluoroacetic acid are added thereto, and the resulting sample is subjected to 500 MHz proton NMR (with JEOL GX-500) at 80° C. From the peak derived from methine of vinyl alcohol unit (3.2 to 4.0 ppm, integral value A) and from the peak derived from one methine of 1,2-glycol bond (3.25 ppm, integral value B), the 1,2-glycol bond content of PVA is calculated according to the equation mentioned below.

1,2-Glycol bond content (mol %)=100B/A.

The 1,2-glycol bond content of PVA may also be obtained from polyvinyl acetal. In this case, polyvinyl acetal is reacted with hydroxylamine hydrochloride in an alcohol solvent, and the resulting reaction product is fully reprecipitated and purified in water/alcohol to give PVA. After this, the resulting PVA is processed to prepare a sample for analysis thereof in the same manner as above.

For terminating PVA with an ionic group via a sulfido group, in this invention, herein employable is a chain transfer polymerization method of radical-polymerizing a vinyl ester monomer in the presence of an ionic group-having mercaptan. The production of modified PVA according to the method is described in detail, for example, in JP-A 57-28121, 57-105410, 1-26602.

In the invention, the 1,2-glycol bond content of PVA may be controlled by controlling the polymerization temperature in radical polymerization of the starting vinyl ester monomer or by copolymerizing the vinyl ester monomer with any other monomer such as vinylene carbonate.

The vinyl ester monomer includes, for example, vinyl formate, vinyl acetate, vinyl propionate, vinyl valerate, vinyl caprate, vinyl laurate, vinyl stearate, vinyl benzoate, vinyl pivalate and vinyl versatate. Of those, preferred is vinyl acetate for obtaining PVA.

The ionic group-having mercaptan includes, for example, mercaptocarboxylic acids such as mercaptoacetic acid, 3-mercaptopropionic acid, 4-mercaptobutanoic acid, 5-mercaptopentanoic acid, 6-mercaptohexanoic acid, 8-mercaptooctanoic acid; mercaptosulfonic acids such as mercaptomethanesulfonic acid, 2-mercaptoethanesulfonic acid, 3-mercaptopropanesulfonic acid, 4-mercaptobutanesulfonic acid, 5-mercaptopentanesulfonic acid, 6-mercaptohexanesulfonic acid, 8-mercaptooctanesulfonic acid; mercaptophosphonic acids such as mercaptomethanephosphonic acid, 2-mercaptoethanephosphonic acid, 3-mercaptopropanephosphonic acid, 4-mercaptobutanephosphonic acid, 5-mercaptopentanephosphonic acid, 6-mercaptohexanephosphonic acid, 8-mercaptooctanephosphonic acid; mercaptoalkane-monophosphates such as mercaptomethane-monophosphate, 2-mercaptoethane-monophosphate, 3-mercaptopropane-monophosphate, 4-mercaptobutane-monophosphate, 5-mercaptopentane-monophosphate, 6-mercaptohexane-monophosphate, 8-mercaptooctane-monophosphate; and mercaptoalkyl group-having quaternary ammonium salts such as mercaptomethanetrimethylammonium chloride, 2-mercaptoethanetrimethylammonium chloride, 3-mercaptopropanetrimethylammonium chloride, 4-mercaptobutanetrimethylammonium chloride, 5-mercaptopentanetrimethylammonium chloride, 6-mercaptohexanetrimethylammonium chloride, 8-mercaptooctanetrimethylammonium chloride. Of those, preferred are mercaptocarboxylic acids and mercaptosulfonic acids.

Not interfering with the advantages of the invention, PVA for use herein may contain any other monomer units than vinyl alcohol units and vinyl ester units. The additional units are monomer units derived from various monomers, for example, α-olefins such as ethylene, propylene, isobutene; carboxyl group-having monomers derived from fumaric acid, maleic acid, itaconic acid, maleic anhydride, itaconic anhydride; acrylic acid and its salts, acrylates such as methyl acrylate, ethyl acrylate, n-propyl acrylate, i-propyl acrylate; methacrylic acid and its salts, methacrylates such as methyl methacrylate, ethyl methacrylate, n-propyl methacrylate, i-propyl methacrylate; acrylamide and its derivatives such as N-methylacrylamide, N-ethylacrylamide; methacrylamide and its derivatives such as N-methylmethacrylamide, N-ethylmethacrylamide; N-vinylamides such as N-vinylacetamide, N-vinylpyrrolidone, N-vinylcaprolactam; vinyl ethers such as methyl vinyl ether, ethyl vinyl ether, n-propyl vinyl ether, i-propyl vinyl ether, n-butyl vinyl ether; hydroxy group-having vinyl ethers such as ethylene glycol vinyl ether, 1,3-propanediol vinyl ether, 1,4-butanediol vinyl ether; allyl acetate; allyl ethers such as propyl allyl ether, butyl allyl ether, hexyl allyl ether; oxyalkylene group-having monomers, vinylsilanes such as vinyltrimethoxysilane; isopropenyl acetate; hydroxy group-having α-olefins such as 3-butene-1-ol, 4-pentene-1-ol, 5-hexene-1-ol, 7-octene-1-ol, 9-decene-1-ol, 3-methyl-3-butene-1-ol; sulfonic acid group-having monomers derived from ethylenesulfonic acid, allylsulfonic acid, methallylsulfonic acid, 2-acrylamido-2-methylpropanesulfonic acid; and cationic group-having monomers derived from vinyloxyethyltrimethylammonium chloride, vinyloxybutyltrimethylammonium chloride, vinyloxyethyldimethylamine, vinyloxymethyldiethylamine, N-acrylamidomethyltrimethylammonium chloride, N-acrylamidoethyltrimethylammonium chloride, N-acrylamidodimethylamine, allyltrimethylammonium chloride, methallyltrimethylammonium chloride, dimethylallylamine, allylethylamine. The additional monomer unit content of PVA is generally at most 20 mol %, but preferably at most 10 mol %, more preferably at most 5 mol %.

PVA for use in the invention, which is terminated with an ionic group via a sulfido bond may be produced, for example, through polymerization of a vinyl ester monomer such as vinyl acetate along with an ionic group-having mercaptan such as that mentioned hereinabove and with a thiol compound such as 2-mercaptoethanol or n-dodecylmercaptan, followed by hydrolyzing the resulting polyvinyl ester.

The radical polymerization of a vinyl ester monomer in the presence of an ionic group-having mercaptan may be effected in any known mode of bulk polymerization, solution polymerization, suspension polymerization or emulsion polymerization. Of those, generally employed is bulk polymerization to be effected in the absence of a solvent, or solution polymerization to be effected in a solvent such as alcohol. For efficiently introducing an ionic group-having mercaptan into the terminal of PVA, it is desirable that the mercaptan of the type is added to PVA in accordance with the reactivity of the vinyl ester monomer to give PVA. One concrete method for it comprises controlling the molar concentration of the vinyl ester monomer and the mercaptan to be in a constant ratio of the two in the polymerization system. The solvent, alcohol to be used in solution polymerization may be a lower alcohol such as methyl alcohol, ethyl alcohol, propyl alcohol. The initiator to be used in polymerization may be any of azo initiators such as α,α'-azobisisobutyronitrile, 2,2'-azobis(2,4-dimethyl-valeronitrile); and peroxide initiators such as benzoyl peroxide, n-propyl peroxycarbonate. Though not specifically defined, the polymerization temperature is generally between 0° C. and 150° C., preferably between 10° C. and 120° C., more preferably between 30° C. and 100° C., even more preferably between 40° C. and 80° C.

The polyvinyl ester that is obtained through radical polymerization of a vinyl ester monomer in the presence of an ionic group-having mercaptan according to the method mentioned above may be hydrolyzed in an alcohol or dimethylsulfoxide solution to give a PVA terminated with an ionic group via a sulfido bond.

In hydrolyzing the polyvinyl ester, an alkaline substance such as potassium hydroxide or sodium hydroxide is used for the catalyst. Preferably, the molar ratio of the alkaline substance falls between 0.004 and 0.5 to the vinylester units of the polymer, more preferably between 0.005 and 0.05. The alkaline substance may be added to the system in the initial stage of hydrolysis all at a time, or may be intermittently added thereto during hydrolysis.

The solvent to be used in hydrolysis of polyvinyl ester includes, for example, methanol, methyl acetate, dimethylsulfoxide and dimethylformamide. Of those solvents, preferred is methanol. Preferably, the water content of methanol to be used for the solvent is controlled to fall between 0.001 and 1% by weight, more preferably between 0.003 and 0.9% by weight, even more preferably between 0.005 and 0.8% by weight.

In hydrolyzing the polyvinyl ester, the polymer concentration is preferably controlled to fall between 10 and 70%, more preferably between 20 and 65%. The temperature in hydrolysis preferably falls between 5 and 80° C., more preferably between 20 and 70° C. The time for hydrolysis preferably falls between 5 minutes and 10 hours, more preferably between 10 minutes and 5 hours. To hydrolysis of polyvinyl ester, applicable is any known batch process or continuous process.

PVA, which is thus obtained through hydrolysis of polyvinyl ester and is terminated with an ionic group via a sulfido bond, is then washed.

The washing liquid usable for it includes, for example, methanol, acetone, methyl acetate, hexane and water. Of those, preferred are methanol, methyl acetate and water, which may be used singly or as a mixture of any of them. Preferably, the amount of the washing liquid to be used generally falls between 2 and 10000 parts by weight, more preferably between 3 and 3000 parts by weight relative to 100 parts by weight of PVA. The temperature in washing preferably falls between 5 and 80° C., more preferably between 20 and 70° C. The time for washing preferably falls between 20 minutes and 10 hours, more preferably between 1 hour and 6 hours. For washing PVA, employable is any known batch process or countercurrent cascade process.

PVA thus produced according to the method as above and terminated with an ionic group via a sulfido bond is acetalized into polyvinyl acetal under an acidic condition in an aqueous solvent according to a known method. The polyvinyl acetal thus obtained herein has a degree of acetalization of from 45 to 80 mol %, preferably from 50 to 80 mol %, more preferably from 60 to 80 mol %. Polyvinylacetal of which the degree of acetalization is lower than 45 mol % is unfavorable since the powdery reaction product obtained through acetalization will be difficult to recover. In addition, when it is used for binders for ceramic forming, then the ceramic green sheets produced could not be homogeneous; and when it is used for binder in ink and paint, then ink or paint having a low solution viscosity and a high solid content (high pigment content) is difficult to produce, and, in addition, the durability of the films formed of such ink or paint will be poor. On the other hand, when the degree of acetalization of polyvinyl acetal is higher than 80 mol %, the polyvinyl acetal of the type will be difficult to produce. In addition, when the polyvinyl acetal obtained from such PVA is used for binders for ceramic forming, then the ceramic green sheets produced could not be homogeneous and the mechanical strength thereof may lower. When it is used for binders for ink or paint, it will be ineffective for lowering the solution viscosity of the ink or paint and for increasing the solid content (pigment content) thereof.

For acetalization of PVA that is terminated with an ionic group via a sulfido bond, for example, employable is (a) a method that comprises dissolving PVA of the type in water under heat to prepare an aqueous PVA solution having a concentration of from 5 to 30%, cooling it to a temperature falling between 5 and 50° C., adding thereto a predetermined amount of aldehyde, then further cooling it to a temperature falling between −10 and 30° C., and controlling the pH of the aqueous solution to be at most 1 by adding acid thereto to thereby initiate acetalization of PVA; or (b) a method that comprises dissolving PVA of the type in water under heat to prepare an aqueous PVA solution having a concentration of from 5 to 30%, cooling it to a temperature falling between 5 and 50° C., controlling the pH of the aqueous solution to be at most 1 by adding acid thereto, then further cooling it to a temperature falling between −10 and 30° C., and adding thereto a predetermined amount of aldehyde to thereby initiate acetalization of PVA.

The time for acetalization generally falls between 1 and 10 hours or so, and the reaction is preferably effected with stirring. In case where the degree of acetalization of the polyvinyl acetal prepared according to the above-mentioned acetalization method could not increase, the reaction may be further continued at an elevated temperature falling between 50 and 80° C. or so.

The powdery reaction product obtained through the acetalization is taken out through filtration, neutralized with an aqueous alkali solution, then washed with water and dried to obtain the intended polyvinyl acetal.

The aldehyde compound to be used for the acetalization includes, for example, formaldehyde, acetaldehyde, propionaldehyde, butylaldehyde, hexylaldehyde and benzaldehyde. These may be used singly or as a mixture of two or more of them. Preferred examples of the aldehyde compounds are alkylaldehydes having at most 4 carbon atoms and benzaldehyde, and butylaldehyde is more preferred.

The acid to be used in acetalization is generally an inorganic acid such as hydrochloric acid, sulfuric acid or nitric acid, or an organic acid such as p-toluenesulfonic acid. These acids may be used singly or as a mixture of two or more of them. The alkali compound to be used for neutralizing the powdery reaction product obtained after the acetalization includes, for example, alkali metal hydroxides such as sodium hydroxide and potassium hydroxide, as well as amine compounds such as ammonia, triethylamine and pyridine.

The polyvinyl acetal composition of the invention contains (A) a polyvinyl acetal which has a degree of acetalization of from 45 to 80 mol % and is obtained through acetalization of a polyvinyl alcohol having a degree of polymerization of from 30 to 1000 and a degree of hydrolysis of from 80.0 to 99.99 mol % and terminated with an ionic group via a sulfido bond while satisfying the requirement of the above-mentioned formula (1), and (B) a polyvinyl acetal having a degree of acetalization of from 45 to 80 mol % and obtained through acetalization of a polyvinyl alcohol having a degree of polymerization of from 100 to 4000 and a degree of hydrolysis of from 80.0 to 99.99 mol %, in a ratio by weight of $5/95 \leq (A)/(B) \leq 100/0$.

If the degree of polymerization of PVA for the polyvinyl acetal (B) to be combined with the polyvinyl acetal (A) in the invention is smaller than 100, PVA of the type will be difficult to produce on an industrial scale; but if larger than 4000, the ceramic green sheets produced by the use of the polymer composition serving as a binder could not be homogeneous. In addition, when the polymer composition of the type is used for binders for ink or paint, the resulting ink or paint could not have a lowered solution viscosity and an increased solid content (pigment content). On the other h and, if the degree of hydrolysis of PVA for the polyvinyl acetal (B) is lower than 80 mol %, then the ceramic green sheets produced by the use of the polymer composition serving as a binder could not be homogeneous. In addition, when the polymer composition of the type is sued for binders for ink or paint, the resulting ink or paint could not have a lowered solution viscosity and an increased solid content (pigment content). PVA having a degree of hydrolysis of higher than 99.99 mol % will be difficult to produce.

In the polyvinyl acetal composition of the invention, the ratio by weight of (A) to (B) must be $5/95 \leq (A)/(B) \leq 100/0$. Preferably, the lowermost limit of the weight ratio of (A)/(B) is 10/90, more preferably 20/80. If the ratio (A)/(B) is smaller than 5/95, then the component (A) will be ineffective, and, in addition, when the polymer composition is used for ceramic binders, the ceramic green sheets produced could not be homogenous, and when it is used for binders for ink and paint, the resulting ink and paint could not have a lowered solution viscosity and an increased solid content (increased pigment content).

For producing the polyvinyl acetal composition of the invention, for example, employable is a method comprising separately preparing (A) and (B) followed by mixing the two; or a method comprising preparing an aqueous solution of a mixture of a polyvinyl alcohol (A) having a degree of polymerization of from 30 to 1000 and a degree of hydrolysis of from 80.0 to 99.99 mol % and terminated with an ionic group via a sulfido bond under the condition that satisfies the above-mentioned formula (1), and a polyvinyl alcohol (B) having a degree of polymerization of from 100 to 4000 and a degree of hydrolysis of from 80.0 to 99.99 mol %, followed by acetalyzing the resulting solution in the manner mentioned above to give a mixture of polyvinyl acetals (A) and (B).

In case where the two types of polyvinyl acetals (A) and (B) are combined for use herein, the mean content of the ionic group bonded via sulfido bond to PVA that is the starting material for the polyvinyl acetal (A) is preferably at least 0.15 mol % of the overall monomer units of the total of the PVA to give the polyvinyl acetal (A) and the PVA to give the polyvinyl acetal (B) In case where the two types of polyvinyl acetals (A) and (B) are so combined that the mean content of the ionic group bonded via sulfido bond to PVA that is the starting material for the polyvinyl acetal (A) could be at least 0.15 mol % of the overall monomer units of the total of the PVA to give the polyvinyl acetal (A) and the PVA to give the polyvinyl acetal (B), and the thus-controlled polymer composition is used for binders for ceramic forming, then the surface condition and the mechanical of the ceramic green sheets produced are both extremely good, as in Examples 18, 19, 23 and 24 mentioned hereinunder; and when the polymer composition is used for binders for ink or paint, then the resulting ink or paint has a lowered solution viscosity and an increased solid content as in Examples 42, 43 and 44 also mentioned below.

For using the polyvinyl acetal or the polyvinyl acetal composition of the invention for binders for ceramic powder, for example, employable is any of sheet forming, pressing, extrusion forming or injection molding.

When the polyvinyl acetal or the polyvinyl acetal composition of the invention is used for binders for ceramic powder to be shaped or molded, an organic solvent is generally used, and, if desired, a plasticizer may also be used along with it. Examples of the organic solvent are alcohols such as methanol, ethanol, isopropanol, n-propanol, butanol; cellosolves such as methyl cellosolve, butyl cellosolve; ketones such as acetone, methyl ethyl ketone; aromatic hydrocarbons such as toluene, xylene; and halogenohydrocarbons such as dichloromethane, chloroform. One or more of these may be used herein either singly or as combined.

Examples of the plasticizer are tri or tetraethylene glycol dicarboxylates such as triethylene glycol di-2-ethylhexanoate, tetraethylene glycol di-2-ethylhexanoate, triethylene glycol di-n-heptanoate, tetraethylene glycol di-n-heptanoate; and dicarboxylates such as dioctyl adipate, dibutyl adipate, dioctyl phthalate, dibutyl phthalate. One or more of these may be used herein either singly or as combined.

The ceramic powder may be powder of metal or non-metal oxide or non-oxide for production of ceramics. Its examples are oxides, carbides, nitrides, borides and sulfides with any of Li, K, Mg, B, Al, Si, Cu, Ca, Sr, Ba, Zn, Cd, Ga, In, Y, lanthanoid, actinoid, Ti, Zr, Hf, Bi, V, Nb, Ta, W, Mn, Fe, Co, Ni. Examples of powdery oxides with multiple metal elements that are generally referred to as double oxides are classified from their crystal structures. Perovskite-structured double oxides include $NaNbO_3$, $SrZrO_3$, $PbZrO_3$, $SrTiO_3$, $BaZrO3$, $PbTiO_3$, $BaTiO_3$; spinel-structured double oxides include $MgAl_2O_4$, $ZnAl_2O_4$, $CoAl_2O_4$, $NiAl_2O_4$, $MgFe_2O_4$; ilmenite-structured double salts include $MgTiO_3$, $MnTiO_3$, $FeTiO_3$; and garnet-structured double salts include $GdGa_5O_{12}$, $Y_6Fe_5O_{12}$. These powdery ceramics may be used herein either singly or as combined.

One preferred method of molding ceramic powder by the use of the polyvinyl acetal or the polyvinyl acetal composition of the invention for a binder for ceramic powder forming is a sheet-forming method, and it comprises applying a slurry of essentially an organic solvent, ceramic powder and the polyvinyl acetal or the polyvinyl acetal composition, onto a carrier film by the use of a blade coater or the like, then drying it, and peeling it from the carrier film to obtain a ceramic green sheet. In this method, the slurry to be applied to the carrier film may optionally contain deflocculant, plasticizer, lubricant and the like, in addition to the essential ingredients of organic solvent, ceramic powder and polyvinyl acetal.

The amount of the polyvinyl acetal to be in the ceramic green sheet could not be unconditionally defined as it varies depending on the use and the object of the ceramic green sheet. Generally, however, it may be from 3 to 20 parts by weight, preferably from 5 to 15 parts by weight relative to 100 parts by weight of the ceramic powder.

When ceramic powder is molded according to the method mentioned above, it must be well dispersed in the slurry thereof. Methods of dispersing ceramic powder in slurry are not specifically defined, and various methods may be employed for it. For example, employable is a method of using a medium-assisted dispersing machine such as bead-mill, ball mill, attritor, paint shaker, sand mill; a method of solid kneading; or a method of using a three-roll kneader. If desired, a dispersant may be used for dispersing ceramic powder in slurry. The dispersant may be an anionic dispersant having a carboxylic acid group, a maleic acid group, a sulfonic acid group or a phosphoric acid group in the molecule. Preferably, the anionic dispersant does not have a metal ion.

The thickness of the ceramic green sheet could not be unconditionally defined as it varies depending on the use and the object thereof. In general, however, it falls between 1 and 300 μm. The drying temperature at which the coating film formed on the carrier film is dried could not also be unconditionally defined as it varies depending on the thickness and other parameters of the ceramic green sheet to be obtained. In general, however, it may fall between 60 and 200° C. or so.

The ceramic green sheets obtained by molding ceramic powder along with the polyvinyl acetal or the polyvinyl acetal composition of the invention that serves as a binder for ceramic forming are favorable for various electronic parts. In particular, they are favorable for chip-type monolithic capacitors that are fabricated by forming an electrode on a ceramic green sheet, piling up them and bonding them under pressure, and baking both the electrode and the ceramic at the same time, and also for IC chip circuit boards.

When the polyvinyl acetal or the polyvinyl acetal composition of the invention is used for binders for ink or paint, the polyvinyl acetal content of ink or paint may be varied in a broad range depending on the intended applications of ink or paint. Preferably, it may be from 1 to 35% by weight, more preferably from 5 to 25% by weight. Ink and paint may contain, for example, from 5 to 25% by weight of pigment, from 5 to 25% by weight of polyvinyl acetal, and some solvent.

The pigment to be in ink or paint may be any and every known organic or inorganic pigment. The solvent that may be in ink or paint includes, for example, alcohols such as ethyl alcohol, and esters such as ethyl acetate.

The binder for ink or paint that comprises the polyvinyl acetal of the invention may be combined with any other extender resin and auxiliary agent. The polyvinyl acetal of the invention may serve by itself as an additive to ink or paint.

Using the binder for ink or paint of the invention brings about the following advantages: The viscosity of the solution obtained by adding one or more pigments to a solution of the binder followed by kneading the resulting pigment paste is lower than the solution viscosity that is estimated from the viscosity of the polyvinyl acetal itself. Therefore, compared with a binder for ink or paint that comprises a known polyvinyl acetal, the binder for ink or paint that comprises the polyvinyl acetal of the invention significantly lowers the solution viscosity. This means that the binder that comprises the polyvinyl acetal of the invention reduces the necessary amount of varnish or solvent to be used in controlling the viscosity of ink or paint, and it increases the acceptable pigment content of ink or paint. As a result, the binder for ink or paint of the invention satisfies the requirements heretofore needed for ink and paint in that it may increase the degree of coloration while keeping the optimum viscosity as it is, or it may lower the viscosity not changing the degree of coloration.

Because of its good flowability and good pigment wettability, the polyvinyl acetal of the invention is extremely suitable not only to production of highly-colored printing ink and high-solid paint but also to production of other pigment compositions.

The polyvinyl acetal of the invention is usable not only for binders for ceramic forming and binders for ink or paint, but also for interlayer films for laminated glass and for components of metal primers, lacquers, etc. In addition, it is also favorable for crosslinking with urea resins, melamine resins or epoxy resins.

EXAMPLES

The invention is described in more detail with reference to the following Examples, which, however, are not intended to restrict the scope of the invention. In the following Examples and Comparative Examples, "part" and "%" are all by weight unless otherwise specifically indicated.

Method of Analyzing PVA:

Unless otherwise specifically indicated, PVA is analyzed according to the method described in JIS-K6726.

The amount of the ionic group bonded to the terminal of PVA via a sulfido bond and 1,2-glycol bond content in PVA are measured according to the method mentioned hereinabove, using a 500 MHz-proton NMR device (JEOL GX-500).

Method of Analyzing Polyvinyl Acetal:

The degree of acetalization of polyvinylacetal is obtained by analyzing a sample of the polymer dissolved in DMSO-d6, using a 500-MHz proton NMR device (JEOL GX-500).

Production Example:

Production of PVA:

2800 g of vinyl acetate and 680 g of methanol were fed into a 6-liter separable flask equipped with a stirrer, a reflux duct and a delay solution inlet mouth, then heated up to 60° C., and then bubbled with nitrogen gas for 30 minutes to purge the system with nitrogen. A methanol solution of a 5 wt. % chain transfer agent, 3-mercaptopropionic acid was prepared, and this was bubbled with nitrogen gas to purge it with nitrogen. 5.4 g of the solution was added to the flask. Then, the inner temperature of the flask was controlled at 60° C., and a solution of 2.2 g of an initiator, 2,2'-azobisisobutyronitrile in 20 g of methanol was added to the flask to initiate the polymerization. During the polymerization, the temperature was kept at 60° C., and a methanol solution of 5 wt. % 3-mercaptoproionic acid was continuously added to the polymerization system. After 5 hours when the conversion reached 70%, the flask was cooled to stop the polymerization therein. During the polymerization, the amount of the methanol solution of 5 wt. % 3-mercaptopropionic acid continuously added to the polymerization system was 129.3 g. Next, methanol vapor was introduced into the reaction liquid obtained through polymerization to remove the non-reacted vinyl acetate monomer. A methanol solution with 50% polyvinyl ester was thus obtained.

To the methanol solution of 50% polyvinyl ester, added were a suitable amount of methanol and a methanol solution of 10 wt. % sodium hydroxide in that order, and the polymer was thus hydrolyzed at 40° C. At the start of the hydrolysis, the solid concentration of the polyvinyl ester was 35% by weight. Adding the sodium hydroxide-containing methanol solution to the system was effected with stirring, and the amount of sodium hydroxide added was 0.015 in terms of the molar ratio to the vinyl acetate units in the polyvinyl ester. About 2 minutes after the start of the addition of the sodium hydroxide-containing methanol solution to the polymer system, the resulting gel was ground in a mill and left at 40° C. for 1 hour for further hydrolysis. Then, methyl acetate was added to it to neutralize the remaining alkali. With a phenolphthalein indicator, the finish of neutralization was confirmed, and then a white PVA solid was taken out through filtration. Methanol of 5 times was added to the thus-obtained PVA solid and left at room temperature for 3 hours to wash the PVA solid. The washing operation was repeated three times. Thus washed, the PVA solid was dewatered through centrifugation, and then dried in a drier at 70° C. for 2 days. PVA thus obtained (PVA-1a) was analyzed, and its data are given in Table 1 and Table 2. Apart from it, the polyvinyl ester was hydrolyzed to a degree of hydrolysis of 99.95 mol % or more, subjected to methanol-Soxhlet extraction for 3 days and well washed, and then dried under reduced pressure at 90° C. for 2 days to prepare a sample of PVA for analysis. This was subjected to proton NMR with a solvent, DMSO-d6. From the peak (2.6 ppm) derived from the methylene bonding to the sulfur atom of the polymer, the ionic group content of the polymer was calculated, and it was 0.28 mol %. Similarly, the 1,2-glycol bond content of the polymer was calculated, and it was 1.52 mol %.

Changing the reaction condition as in Tables 1, 3, 5 and 7, other various PVAs (PVA-2a to PVA-34a, and PVA-1b to PVA-18b) were produced in the same manner as that for PVA-1a. The analytical data of each PVA are given in Table 2, Table 4, Table 6 and Table 8. When the polymerization temperature was over 60° C., the polymerization was effected in an autoclave equipped with the same attachments.

TABLE 1

| PVA | Polymerization Temperature (° C.) | Initial Feed VAc(g) | Initial Feed MeOH(g)[1] | Initial Feed Chain Transfer Agent[2] | Chain Transfer Agent (g)[3] | Amount of Intermittent Addition during Polymerization (g)[3] | Initiator[4] | Amount of Initiator Added (g) | Conversion (%) | Polymerization time (hr) | NaOH molar ratio | PVAc concentration (%) |
|---|---|---|---|---|---|---|---|---|---|---|---|---|
| PVA-1a | 60 | 2800 | 700 | 3-MPA 5% MeOH | 5.4 | 129.3 | AIBN | 2.2 | 70 | 5.0 | 0.015 | 35 |
| PVA-2a | 60 | 2800 | 700 | 3-MPA 3% MeOH | 4.7 | 95.5 | AIBN | 1.7 | 65 | 5.0 | 0.015 | 30 |
| PVA-3a | 60 | 2800 | 700 | 3-MPA 15% MeOH | 5.0 | 129.2 | AIBN | 2.5 | 70 | 5.0 | 0.015 | 50 |
| PVA-4a | 60 | 2800 | 700 | 3-MPA 25% MeOH | 7.7 | 206.3 | AIBN | 3.0 | 70 | 5.0 | 0.015 | 60 |
| PVA-5a | 60 | 2800 | 700 | 3-MPS 7.4% MeOH | 5.5 | 130.1 | AIBN | 2.3 | 70 | 5.0 | 0.015 | 35 |
| PVA-6a | 60 | 2800 | 700 | 3-MPP 6.6% MeOH | 5.3 | 128.9 | AIBN | 2.2 | 70 | 5.0 | 0.015 | 35 |
| PVA-7a | 60 | 2800 | 700 | 3-MPT 8% MeOH | 5.5 | 129.5 | AIBN | 2.4 | 70 | 5.0 | 0.015 | 35 |
| PVA-8a | 60 | 1750 | 1750 | 3-MPA 3% MeOH | 4.6 | 105.7 | AIBN | 2.6 | 70 | 5.0 | 0.015 | 35 |
| PVA-9a | 60 | 2800 | 700 | 3-MPA 5% MeOH | 5.4 | 129.3 | AIBN | 2.2 | 70 | 5.0 | 0.05 | 35 |
| PVA-10a | 60 | 2800 | 700 | 3-MPA 5% MeOH | 5.4 | 129.3 | AIBN | 2.2 | 70 | 5.0 | 0.01 | 35 |
| PVA-11a | 40 | 2800 | 700 | 3-MPA 5% MeOH | 5.6 | 106.0 | AMV | 0.8 | 50 | 5.0 | 0.02 | 35 |
| PVA-12a | 80 | 3150 | 350 | 3-MPA 5% MeOH | 6.0 | 128.0 | V-40 | 2.2 | 60 | 4.0 | 0.02 | 35 |

TABLE 1-continued

| PVA | Polymerization Temperature (° C.) | Initial Feed VAc(g) | Initial Feed MeOH(g)[1] | Initial Feed Chain Transfer Agent[2] | Chain Transfer Agent (g)[3] | Amount of Intermittent Addition during Polymerization (g)[3] | Initiator[4] | Amount of Initiator Added (g) | Conversion (%) | Polymerization time (hr) | NaOH molar ratio | PVAc concentration (%) |
|---|---|---|---|---|---|---|---|---|---|---|---|---|
| PVA-13a | 120 | 3325 | 175 | 3-MPA 3% MeOH | 10 | 73.5 | V-40 | 47.7[5] | 20 | 3.0 | 0.02 | 35 |
| PVA-14a | 10 | 1050 | 2450 | 3-MPA 8% MeOH | 1.1 | 12.4 | AMV | 10.5 | 30 | 12.0 | 0.02 | 35 |
| PVA-15a | 60 | 2800 | 700 | 3-MPA 5% MeOH | 5.4 + 11.2[6] | 129.3 | AIBN | 2.2 | 70 | 6.0 | 0.015 | 35 |
| PVA-16a | 60 | 2800 | 700 | 3-MPA 5% MeOH | 5.4 + 28.3[6] | 129.3 | AIBN | 2.2 | 70 | 6.5 | 0.015 | 32 |
| PVA-17a | 60 | 2800 | 0 | 3-MPA 25% MeOH | 9.7 | 225.3 | AIBN | 1.1 | 60 | 5.5 | 0.015 | 60 |

[1] Containing MeOH used for dissolving the initiator.
[2] 3-MPA: 3-mercaptopropionic acid, 3-MPS: 3-mercaptopropanesulfonic acid, 3-MPP: 3-mercaptopropanephosphonic acid, 3-MPT: 3-mercaptopropanetrimethylammonium chloride.
[3] Amount of MeOH solution of chain transfer agent.
[4] AIBN: 2,2'-azobisisobutyronitrile, AMV: 2,2'-azobis(4-methoxy-2,4-dimethylvaleronitrile), V-40: 1,1'-azobis(cyclohexane-1-carbonitrile).
[5] MeOH solution of 0.1 g/liter initiator was fed. The initial feed was 3.3 ml, and the total feed was 47.7 ml.
[6] Amount of MeOH solution of chain transfer agent + amount of vinylene carbonate added.

TABLE 2

| PVA | Degree of Polymerization | Degree of Hydrolysis (mol %) | 1,2-Glycol Bond Content (mol %) | Ionic Group Content (mol %) |
|---|---|---|---|---|
| PVA-1a | 500 | 97.2 | 1.52 | 0.28 |
| PVA-2a | 850 | 97.8 | 1.52 | 0.18 |
| PVA-3a | 200 | 97.5 | 1.52 | 0.82 |
| PVA-4a | 80 | 96.9 | 1.52 | 2.18 |
| PVA-5a | 500 | 97.0 | 1.52 | 0.29 |
| PVA-6a | 500 | 96.8 | 1.52 | 0.30 |
| PVA-7a | 500 | 96.7 | 1.52 | 0.27 |
| PVA-8a | 500 | 97.1 | 1.52 | 0.17 |
| PVA-9a | 500 | 99.5 | 1.52 | 0.28 |
| PVA-10a | 500 | 91.5 | 1.52 | 0.28 |
| PVA-11a | 500 | 98.2 | 1.30 | 0.30 |
| PVA-12a | 500 | 98.1 | 1.75 | 0.28 |
| PVA-13a | 500 | 98 | 2.23 | 0.28 |
| PVA-14a | 500 | 98.1 | 0.98 | 0.26 |
| PVA-15a | 500 | 97.3 | 1.92 | 0.28 |
| PVA-16a | 500 | 97.0 | 2.52 | 0.28 |
| PVA-17a | 80 | 96.8 | 1.52 | 2.22 |

TABLE 3

| PVA | Polymerization Temperature (° C.) | Initial Feed VAc(g) | Initial Feed MeOH(g)[1] | Initial Feed Chain Transfer Agent[2] | Chain Transfer Agent (g)[3] | Amount of Intermittent Addition during Polymerization (g)[3] | Initiator[4] | Amount of Initiator Added (g) | Conversion (%) | Polymerization time (hr) | NaOH molar ratio | PVAc concentration (%) |
|---|---|---|---|---|---|---|---|---|---|---|---|---|
| PVA-1b | 60 | 1050 | 2450 | no | no | no | AIBN | 2.4 | 70 | 5.0 | 0.015 | 35 |
| PVA-2b | 60 | 1505 | 1995 | no | no | no | AIBN | 1.9 | 65 | 5.0 | 0.015 | 30 |
| PVA-3b | 60 | 525 | 2975 | no | no | no | AIBN | 2.6 | 70 | 5.0 | 0.015 | 50 |
| PVA-4b | 60 | 245 | 3255 | no | no | no | AIBN | 2.5 | 70 | 5.0 | 0.015 | 60 |
| PVA-5b | 60 | 2800 | 700 | 3-MPA 2% MeOH | 4.4 | 74.7 | AIBN | 1.3 | 60 | 5.0 | 0.015 | 30 |

TABLE 3-continued

| PVA | Polymerization Temperature (° C.) | Initial Feed | | | Amount of Intermittent Addition during Polymerization (g)[3] | Initiator[4] | Amount of Initiator Added (g) | Conversion (%) | Polymerization time (hr) | NaOH molar ratio | PVAc concentration (%) |
|---|---|---|---|---|---|---|---|---|---|---|---|
| | | VAc(g) | MeOH(g)[1] | Chain Transfer Agent[2] | Chain Transfer Agent (g)[3] | | | | | | |
| PVA-6b | 60 | 1855 | 1645 | no | no | no | AIBN | 1.4 | 60 | 5.0 | 0.015 | 30 |
| PVA-7b | 60 | 2800 | 700 | 3-MPA 5% MeOH | 5.4 | 129.3 | AIBN | 2.2 | 70 | 5.0 | 0.004 | 35 |
| PVA-8b | 60 | 3500 | 0 | 3-MPA 5% MeOH | 7.2 | 135 | AIBN | 1.1 | 50 | 4.0 | 0.015 | 35 |
| PVA-9b | 40 | 3500 | 0 | 3-MPA 5% MeOH | 7.4 | 138.9 | AMV | 1.1 | 50 | 4.0 | 0.015 | 35 |
| PVA-10b | 30 | 3500 | 0 | 3-MPA 3% MeOH | 7 | 27.5 | AMV | 0.1 | 10 | 4.0 | 0.015 | 30 |

[1] Containing MeOH used for dissolving the initiator.
[2] 3-MPA: 3-mercaptopropionic acid.
[3] Amount of MeOH solution of chain transfer agent.
[4] AIBN: 2,2'-azobisisobutyronitrile, AMV: 2,2'-azobis(4-methoxy-2,4-dimethylvaleronitrile).

TABLE 4

| PVA | Degree of Polymerization | Degree of Hydrolysis (mol %) | 1,2-Glycol Bond Content (mol %) | Ionic Group Content (mol %) |
|---|---|---|---|---|
| PVA-1b | 500 | 97.2 | 1.52 | no |
| PVA-2b | 850 | 97.6 | 1.52 | no |
| PVA-3b | 200 | 97.3 | 1.52 | no |
| PVA-4b | 80 | 96.5 | 1.52 | no |
| PVA-5b | 1200 | 98.1 | 1.52 | 0.08 |
| PVA-6b | 1200 | 98.2 | 1.52 | no |
| PVA-7b | 500 | 75.3 | 1.52 | 0.28 |
| PVA-8b | 500 | 97.3 | 1.52 | 0.33 |
| PVA-9b | 500 | 97.1 | 1.3 | 0.34 |
| PVA-10b | 850 | 97.7 | 1.3 | 0.21 |

TABLE 5

| PVA | Polymerization Temperature (° C.) | Initial Feed | | | Amount of Intermittent Addition during Polymerization (g)[3] | Initiator[4] | Amount of Initiator Added (g) | Conversion (%) | Polymerization time (hr) | NaOH molar ratio | PVAc concentration (%) |
|---|---|---|---|---|---|---|---|---|---|---|---|
| | | VAc(g) | MeOH(g)[1] | Chain Transfer Agent[2] | Chain Transfer Agent (g)[3] | | | | | | |
| PVA-18a | 60 | 2800 | 700 | 3-MPA 15% MeOH | 5.0 | 129.2 | AIBN | 2.5 | 70 | 5.0 | 0.012 | 50 |
| PVA-19a | 60 | 2800 | 700 | 3-MPA 5% MeOH | 5.4 | 129.3 | AIBN | 2.2 | 70 | 5.0 | 0.012 | 35 |
| PVA-20a | 60 | 2800 | 700 | 3-MPA 25% MeOH | 7.7 | 206.3 | AIBN | 3.0 | 70 | 5.0 | 0.015 | 60 |
| PVA-21a | 60 | 2800 | 700 | 3-MPA 10% MeOH | 4.8 | 122.1 | AIBN | 2.2 | 70 | 5.0 | 0.015 | 40 |
| PVA-22a | 60 | 2800 | 700 | 3-MPS 22.2% MeOH | 5.1 | 129.9 | AIBN | 2.6 | 70 | 5.0 | 0.012 | 50 |
| PVA-23a | 60 | 2800 | 700 | 3-MPP 19.8% MeOH | 4.9 | 128.8 | AIBN | 2.5 | 70 | 5.0 | 0.012 | 50 |
| PVA-24a | 60 | 2800 | 700 | 3-MPT 24% MeOH | 5.1 | 129.4 | AIBN | 2.7 | 70 | 5.0 | 0.012 | 50 |
| PVA-25a | 60 | 525 | 2975 | 3-MPA 3% MeOH | 2.3 | 25.8 | AIBN | 2.5 | 70 | 5.0 | 0.012 | 50 |
| PVA-26a | 60 | 2800 | 700 | 3-MPA 15% MeOH | 5.0 | 129.2 | AIBN | 2.5 | 70 | 5.0 | 0.03 | 50 |

TABLE 5-continued

| PVA | Polymerization Temperature (° C.) | Initial Feed VAc(g) | MeOH(g)[1] | Chain Transfer Agent[2] | Chain Transfer Agent (g)[3] | Amount of Intermittent Addition during Polymerization (g)[3] | Initiator[4] | Amount of Initiator Added (g) | Conversion (%) | Polymerization time (hr) | NaOH molar ratio | PVAc concentration (%) |
|---|---|---|---|---|---|---|---|---|---|---|---|---|
| PVA-27a | 60 | 2800 | 700 | 3-MPA 15% MeOH | 5.0 | 129.2 | AIBN | 2.5 | 70 | 5.0 | 0.01 | 50 |
| PVA-28a | 40 | 2100 | 1400 | 3-MPA 15% MeOH | 3.7 | 69.3 | AMV | 1.2 | 50 | 4.0 | 0.02 | 50 |
| PVA-29a | 80 | 2800 | 700 | 3-MPA 15% MeOH | 4.9 | 91.7 | V-40 | 1.3 | 50 | 4.0 | 0.02 | 50 |
| PVA-30a | 120 | 2800 | 700 | 3-MPA 15% MeOH | 4.6 | 84.0 | V-40 | 343[5] | 50 | 4.0 | 0.02 | 50 |
| PVA-31a | 10 | 1050 | 2450 | 3-MPA 15% MeOH | 1.8 | 20.4 | AMV | 10.5 | 30 | 12.0 | 0.02 | 50 |
| PVA-32a | 60 | 2800 | 700 | 3-MPA 15% MeOH | 5.4 + 11.2[6] | 129.2 | AIBN | 2.5 | 70 | 6.0 | 0.012 | 50 |
| PVA-33a | 60 | 2800 | 700 | 3-MPA 15% MeOH | 5.4 + 28.3[6] | 129.2 | AIBN | 2.5 | 70 | 6.5 | 0.012 | 50 |
| PVA-34a | 60 | 2800 | 0 | 3-MPA 25% MeOH | 9.7 | 225.3 | AIBN | 1.1 | 60 | 5.5 | 0.015 | 60 |

[1] Containing MeOH used for dissolving the initiator.
[2] 3-MPA: 3-mercaptopropionic acid, 3-MPS: 3-mercaptopropanesulfonic acid, 3-MPP: 3-mercaptopropanephosphonic acid, 3-MPT: 3-mercaptopropanetrimethylammonium chloride.
[3] Amount of MeOH solution of chain transfer agent.
[4] AIBN: 2,2'-azobisisobutyronitrile, AMV: 2,2'-azobis(4-methoxy-2,4-dimethylvaleronitrile), V-40: 1,1'-azobis(cyclohexane-1-carbonitrile).
[5] MeOH solution of 0.1 g/liter initiator was fed. The initial feed was 19.6 ml, and the total feed was 343 ml.
[6] Amount of MeOH solution of chain transfer agent + amount of vinylene carbonate added.

TABLE 6

| PVA | Degree of Polymerization | Degree of Hydrolysis (mol %) | 1,2-Glycol Bond Content (mol %) | Ionic Group Content (mol %) |
|---|---|---|---|---|
| PVA-18a | 200 | 95.2 | 1.52 | 0.82 |
| PVA-19a | 500 | 95.4 | 1.52 | 0.28 |
| PVA-20a | 80 | 97.1 | 1.52 | 2.18 |
| PVA-21a | 300 | 97.2 | 1.52 | 0.52 |
| PVA-22a | 200 | 95.4 | 1.52 | 0.84 |
| PVA-23a | 200 | 95.8 | 1.52 | 0.79 |
| PVA-24a | 200 | 96.2 | 1.52 | 0.81 |
| PVA-25a | 200 | 95.3 | 1.52 | 0.17 |
| PVA-26a | 200 | 99.5 | 1.52 | 0.82 |
| PVA-27a | 200 | 91.5 | 1.52 | 0.82 |
| PVA-28a | 200 | 98.2 | 1.30 | 0.83 |
| PVA-29a | 200 | 98.1 | 1.75 | 0.82 |
| PVA-30a | 200 | 98.0 | 2.23 | 0.74 |
| PVA-31a | 200 | 98.3 | 0.98 | 0.81 |
| PVA-32a | 200 | 95.7 | 1.92 | 0.82 |
| PVA-33a | 200 | 95.0 | 2.52 | 0.82 |
| PVA-34a | 80 | 96.8 | 1.52 | 2.22 |

TABLE 7

| PVA | Polymerization Temperature (° C.) | Initial Feed VAc(g) | MeOH(g)[1] | Chain Transfer Agent[2] | Chain Transfer Agent (g)[3] | Amount of Intermittent Addition during Polymerization (g)[3] | Initiator[4] | Amount of Initiator Added (g) | Conversion (%) | Polymerization time (hr) | NaOH molar ratio | PVAc concentration (%) |
|---|---|---|---|---|---|---|---|---|---|---|---|---|
| PVA-11b | 60 | 525 | 2975 | no | no | no | AIBN | 2.6 | 70 | 5.0 | 0.015 | 50 |
| PVA-12b | 60 | 1050 | 2450 | no | no | no | AIBN | 2.4 | 70 | 5.0 | 0.015 | 35 |
| PVA-13b | 60 | 630 | 2870 | no | no | no | AIBN | 2.5 | 70 | 5.0 | 0.015 | 40 |
| PVA-14b | 60 | 245 | 3255 | no | no | no | AIBN | 2.5 | 70 | 5.0 | 0.015 | 60 |
| PVA-15b | 60 | 2800 | 700 | 3-MPA 15% MeOH | 5.0 | 129.2 | AIBN | 2.5 | 70 | 5.0 | 0.004 | 50 |

TABLE 7-continued

| PVA | Polymerization Temperature (° C.) | Initial Feed | | | Amount of Intermittent Addition | | Initiator[4] | Amount of Initiator Added (g) | Conversion (%) | Polymerization time (hr) | NaOH molar ratio | PVAc concentration (%) |
|---|---|---|---|---|---|---|---|---|---|---|---|---|
| | | VAc(g) | MeOH(g)[1] | Chain Transfer Agent[2] | Chain Transfer Agent (g)[3] | during Polymerization (g)[3] | | | | | | |
| PVA-16b | 60 | 3500 | 0 | 3-MPA 15% MeOH | 6.3 | 121.8 | AIBN | 1.1 | 50 | 4.0 | 0.02 | 50 |
| PVA-17b | 40 | 3500 | 0 | 3-MPA 15% MeOH | 6.3 | 123.1 | AMV | 1.1 | 50 | 4.0 | 0.02 | 50 |
| PVA-18b | 40 | 3500 | 0 | 3-MPA 5% MeOH | 7.4 | 138.9 | AMV | 1.1 | 50 | 4.0 | 0.02 | 35 |

[1]Containing MeOH used for dissolving the initiator.
[2]3-MPA: 3-mercaptopropionic acid.
[3]Amount of MeOH solution of chain transfer agent.
[4]AIBN: 2,2'-azobisisobutyronitrile, AMV: 2,2'-azobis(4-methoxy-2,4-dimethylvaleronitrile).

TABLE 8

| PVA | Degree of Polymerization | Degree of Hydrolysis (mol %) | 1,2-Glycol Bond Content (mol %) | Ionic Group Content (mol %) |
|---|---|---|---|---|
| PVA-11b | 200 | 95.2 | 1.52 | no |
| PVA-12b | 500 | 95.3 | 1.52 | no |
| PVA-13b | 300 | 97.2 | 1.52 | no |
| PVA-14b | 80 | 97.0 | 1.52 | no |
| PVA-15b | 200 | 75.2 | 1.52 | 0.82 |
| PVA-16b | 200 | 98.5 | 1.52 | 0.88 |
| PVA-17b | 200 | 98.3 | 1.30 | 0.89 |
| PVA-18b | 500 | 98.6 | 1.30 | 0.34 |

Example 1

Production of Polyvinyl Acetal:

540 g of PVA (PVA-1a) was put into 6600 ml of water, dissolved therein under heat up to 90° C. with stirring, and then cooled to 30° C. 290 g of butylaldehyde was added to it and dispersed, and then cooled to 0° C. 1090 ml of 20% hydrochloric acid solution was added to it to start the reaction of the compounds. After the addition of hydrochloric acid, the reaction solution was heated up to 30° C. over a period of 3 hours, and then kept at the temperature for further 2 hours. The granular solid thus deposited was taken out through filtration and well washed with water, and 350 ml of 10% sodium hydroxide solution was added to the resulting suspension of the granular solid to neutralize it. Then, this was again gently heated. Further, this was washed with water to remove the excess alkali, and then the granular solid was dried. Thus obtained, the polyvinyl acetal (VAP-1a) was analyzed, and its data are given in Table 9. The polyvinyl acetal was dried at 90° C. under reduced pressure for 2 days, and subjected to proton NMR with a solvent of DMSO-d6. The ionic group content of the polyvinyl acetal was calculated from the peak (at 2.6 ppm) derived from the methylene bonding to the sulfur atom of the polymer, and it was the same as that of the starting polymer, PVA-1a.

Fabrication of Ceramic Green Sheet:

100 parts of ceramic powder, barium titanate powder having a mean particle size of 0.2 μm, 10 parts of polyvinyl acetal (VAP-1a), 3 parts of plasticizer, dioctyl phthalate, and, as solvents, 60 parts of toluene and 60 parts of isopropanol were put into a ball mill along with 500 parts of zirconia balls (diameter, 2 mm), and milled therein for 16 hours. After defoamed under reduced pressure, a ceramic slurry was prepared. The ceramic slurry was applied onto a releasable polyethylene terephthalate film (PET film) with a doctor blade, and dried at 105° C. for 5 minutes. This was then peeled off from the PET film to be a ceramic green sheet having a thickness of 5 μm. Observation of Surface Condition of Ceramic Green Sheet:

With an optical microscope, the surface condition of the ceramic green sheet was observed, and the sheet was evaluated according to the standard mentioned below. The result is given in Table 9.

A: The surface is smooth and homogeneous with neither voids nor aggregated grains.

B: Though having no void, the surface is roughened in some degree owing to the presence of some aggregated grains.

C: Having voids and aggregated grains, the surface is roughened.

Strength of Ceramic Green Sheet:

A sample of the ceramic green sheet is blanked to give a test piece of 40 mm×100 mm in size, and its toughness is measured with Shimadzu's Autograph DCS-100 (chuck-to-chuck distance 30 mm, pulling rate 10 mm/min, temperature 20° C.). One sample was measured 5 times and its data were averaged to be the toughness thereof. The toughness of the sample of Comparative Example 1 is 1.0, as a standard. Based on it, the toughness of the other samples is represented by a relative value (times) The result is given in Table 9.

Examples 2 to 15

From various PVAs (PVA-1a and PVA-5a to PVA-16a) each having a degree of polymerization of 500 shown in Table 2, other various polyvinyl acetals were produced in the same manner as in Example 1. Also in the same manner as in Example 1, ceramic green sheets were fabricated by the use of these polyvinyl acetals. The surface condition of the sheets was observed and the strength thereof was measured. The results and the data are given in Table 9.

Comparative Examples 1 to 7

From PVAs (PVA-1a, PVA-1b and PVA-7b to PVA-9b) each having a degree of polymerization of 500 as in Table 2 and Table 4, various polyvinyl acetals were produced in the same manner as in Example 1. Also in the same manner as in Example 1, ceramic green sheets were fabricated by the use of these polyvinyl acetals. The surface condition of the sheets was observed and the strength thereof was measured. The results and the data are given in Table 9.

TABLE 9

|  | PVA Used | Aldehyde Used | Amount of Aldehyde Added (g) | Degree of Acetalization (mol %) | Polyvinyl Acetal | Surface Condition of Green Sheet | Strength[1] of Green Sheet |
|---|---|---|---|---|---|---|---|
| Example 1 | PVA-1a | butylaldehyde | 290 | 69.2 | VAP-1a | A | 2.2 |
| Example 2 | PVA-5a | butylaldehyde | 289 | 69.1 | VAP-2a | A | 1.9 |
| Example 3 | PVA-6a | butylaldehyde | 285 | 68.5 | VAP-3a | B | 1.4 |
| Example 4 | PVA-7a | butylaldehyde | 284 | 68.6 | VAP-4a | B | 1.3 |
| Example 5 | PVA-8a | butylaldehyde | 295 | 70.8 | VAP-5a | A | 1.9 |
| Example 6 | PVA-9a | butylaldehyde | 286 | 65.4 | VAP-6a | A | 1.8 |
| Example 7 | PVA-10a | butylaldehyde | 244 | 65.2 | VAP-7a | A | 1.7 |
| Example 8 | PVA-1a | propionaldehyde | 226 | 67.1 | VAP-8a | A | 1.5 |
| Example 9 | PVA-1a | butylaldehyde | 237 | 56.5 | VAP-9a | A | 1.6 |
| Example 10 | PVA-11a | butylaldehyde | 308 | 73.5 | VAP-10a | A | 1.7 |
| Example 11 | PVA-12a | butylaldehyde | 315 | 75.2 | VAP-11a | A | 1.8 |
| Example 12 | PVA-13a | butylaldehyde | 289 | 68.9 | VAP-12a | B | 1.3 |
| Example 13 | PVA-14a | butylaldehyde | 291 | 69.5 | VAP-13a | B | 1.4 |
| Example 14 | PVA-15a | butylaldehyde | 291 | 69.5 | VAP-14a | A | 1.8 |
| Example 15 | PVA-16a | butylaldehyde | 290 | 69.1 | VAP-15a | B | 1.3 |
| Comp. Ex. 1 | PVA-1b | butylaldehyde | 291 | 69.5 | VAP-1b | C | 1.0 |
| Comp. Ex. 2 | PVA-7b | butylaldehyde | 186 | 69.1 | VAP-2b | B | 1.0 |
| Comp. Ex. 3 | PVA-1b | propionaldehyde | 227 | 67.5 | VAP-3b | C | 0.8 |
| Comp. Ex. 4 | PVA-1a | butylaldehyde | 173 | 41.2 | VAP-4b | A | 0.9 |
| Comp. Ex. 5 | PVA-1a | butylaldehyde | 346 | 82.5 | VAP-5b | C | 1.1 |
| Comp. Ex. 6 | PVA-8b | butylaldehyde | 294 | 70.2 | VAP-6b | C | 1.1 |
| Comp. Ex. 7 | PVA-9b | butylaldehyde | 292 | 69.7 | VAP-7b | C | 1.1 |

[1] Ratio (times) based on the toughness, 1.0 of the green sheet of Comparative Example 1.

Example 16 and Comparative Examples 8, 9

From PVAs (PVA-2a, PVA-2 band PVA-10b) each having a degree of polymerization of 850 as in Table 2 and Table 4, various polyvinyl acetals were produced in the same manner as in Example 1. Also in the same manner as in Example 1, ceramic green sheets were fabricated by the use of these polyvinyl acetals. The surface condition of the sheets was observed and the strength thereof was measured. The results and the data are given in Table 10.

Example 17 and Comparative Example 10

From PVAs (PVA-3a and PVA-3b) each having a degree of polymerization of 200 as in Table 2 and Table 4, polyvinyl acetals were produced in the same manner as in Example 1. Also in the same manner as in Example 1, ceramic green sheets were fabricated by the use of these polyvinyl acetals. The surface condition of the sheets was observed and the strength thereof was measured. The results and the data are given in Table 11.

TABLE 10

|  | PVA Used | Aldehyde Used | Amount of Aldehyde Added (g) | Degree of Acetalization (mol %) | Polyvinyl Acetal | Surface Condition of Green Sheet | Strength[1] of Green Sheet |
|---|---|---|---|---|---|---|---|
| Example 16 | PVA-2a | butylaldehyde | 282 | 66.6 | VAP-16a | A | 1.7 |
| Comp. Ex. 8 | PVA-2b | butylaldehyde | 280 | 66.3 | VAP-8b | C | 1.0 |
| Comp. Ex. 9 | PVA-10b | butylaldehyde | 289 | 68.2 | VAP-9b | B | 1.0 |

[1] Ratio (times) based on the toughness, 1.0 of the green sheet of Comparative Example 8.

TABLE 11

|  | PVA Used | Aldehyde Used | Amount of Aldehyde Added (g) | Degree of Acetalization (mol %) | Polyvinyl Acetal | Surface Condition of Green Sheet | Strength[1] of Green Sheet |
|---|---|---|---|---|---|---|---|
| Example 17 | PVA-3a | butylaldehyde | 293 | 69.5 | VAP-17a | A | 2.3 |
| Comp. Ex. 10 | PVA-3b | butylaldehyde | 290 | 69.2 | VAP-10b | C | 1.0 |

[1] Ratio (times) based on the toughness, 1.0 of the green sheet of Comparative Example 10

Comparative Examples 11 and 12

From PVAs (PVA-5b and PVA-6b) each having a degree of polymerization of 1200 as in Table 4, polyvinyl acetals were produced in the same manner as in Example 1. Also in the same manner as in Example 1, ceramic green sheets were fabricated by the use of these polyvinyl acetals. The surface condition of the sheets was observed and the strength thereof was measured. The results and the data are given in Table 12.

TABLE 12

| | PVA Used | Aldehyde Used | Amount of Aldehyde Added (g) | Degree of Acetalization (mol %) | Polyvinyl Acetal | Surface Condition of Green Sheet | Strength[1] of Green Sheet |
|---|---|---|---|---|---|---|---|
| Comp. Ex. 11 | PVA-5b | butylaldehyde | 296 | 69.5 | VAP-11b | C | 1.0 |
| Comp. Ex. 12 | PVA-6b | butylaldehyde | 295 | 69.2 | VAP-12b | C | 1.0 |

[1]Ratio (times) based on the toughness, 1.0 of the green sheet of Comparative Example 12.

Examples 18 to 22, and Comparative Example 13

Polyvinyl acetals were produced in the same manner as in Example 1, for which, however, two were selected from PVAs (PVA-2a, PVA-4a, PVA-17a, PVA-2b and PVA-4b) having a degree of polymerization of 80 or 850 shown in Table 2 and Table 4 and these were mixed so that the resulting mixture could have a mean degree of polymerization of 500 and acetalized. Also in the same manner as in Example 1, ceramic green sheets were fabricated by the use of these polyvinyl acetals. The surface condition of the sheets was observed and the strength thereof was measured. The results and the data are given in Table 13.

Examples 23 to 25, and Comparative Example 14

Polyvinyl acetals were produced in the same manner as in Example 1, for which, however, two were selected from PVAs (PVA-2a, PVA-3a, PV-2b and PVA-3b) having a degree of polymerization of 200 or 850 shown in Table 2 and Table 4 and these were mixed so that the resulting mixture could have a mean degree of polymerization of 500. Also in the same manner as in Example 1, ceramic green sheets were fabricated by the use of these polyvinyl acetals. The surface condition of the sheets was observed and the strength thereof was measured. The results and the data are given in Table 14.

TABLE 13

| | PVA Used | Aldehyde Used | Amount of Aldehyde Added (g) | Degree of Acetalization (mol %) | Polyvinyl Acetal | Surface Condition of Green Sheet | Strength[1] of Green Sheet |
|---|---|---|---|---|---|---|---|
| Example 18 | PVA-2a/PVA-4a = 63.5/36.5 | butylaldehyde | 289 | 68.5 | VAP-18a | A | 2.4 |
| Example 19 | PVA-4a/PVA-2b = 36.5/63.5 | butylaldehyde | 283 | 67.5 | VAP-19a | A | 2.3 |
| Example 20 | PVA-2a/PVA-4b = 63.5/36.5 | butylaldehyde | 286 | 68.2 | VAP-20a | B | 1.5 |
| Example 21 | PVA-2a/PVA-17a = 63.5/36.5 | butylaldehyde | 289 | 68.5 | VAP-21a | B | 1.3 |
| Example 22 | PVA-17a/PVA-2b = 36.5/63.5 | butylaldehyde | 283 | 67.5 | VAP-22a | B | 1.3 |
| Comp. Ex. 13 | PVA-2b/PVA-4b = 63.5/36.5 | butylaldehyde | 288 | 68.7 | VAP-13b | C | 1.0 |

[1]Ratio (times) based on the toughness, 1.0 of the green sheet of Comparative Example 13.

TABLE 14

| | PVA Used | Aldehyde Used | Amount of Aldehyde Added (g) | Degree of Acetalization (mol %) | Polyvinyl Acetal | Surface Condition of Green Sheet | Strength[1] of Green Sheet |
|---|---|---|---|---|---|---|---|
| Example 23 | PVA-2a/PVA-3a = 52.7/47.3 | butylaldehyde | 290 | 68.5 | VAP-21a | A | 2.2 |
| Example 24 | PVA-3a/PVA-2b = 47.3/52.7 | butylaldehyde | 287 | 68.0 | VAP-22a | A | 2.3 |
| Example 25 | PVA-2a/PVA-3b = 52.7/47.3 | butylaldehyde | 288 | 68.3 | VAP-23a | B | 1.5 |

TABLE 14-continued

|  | PVA Used | Aldehyde Used | Amount of Aldehyde Added (g) | Degree of Acetalization (mol %) | Polyvinyl Acetal | Surface Condition of Green Sheet | Strength[1] of Green Sheet |
|---|---|---|---|---|---|---|---|
| Comp. Ex. 14 | PVA-2b/PVA-3b = 52.7/ 47.3 | butylaldehyde | 288 | 68.4 | VAP-14b | C | 1.0 |

[1]Ratio (times) based on the toughness, 1.0 of the green sheet of Comparative Example 14.

From the results in Table 9 to Table 14, it is understood that the ceramic green sheets in which the polyvinyl acetal of the invention was used for the binder (Examples 1 to 25) all have a more homogeneous surface condition and have a higher mechanical strength (toughness) than those of the ceramic green sheets in which the polyvinyl acetal not falling within the scope of the invention was used for the binder (Comparative Examples 1 to 14).

In particular, the polyvinyl butyrals having a degree of butyralization of from 60 to 80 mol % and obtained through butyralization of polyvinyl alcohol having a 1,2-glycol content of from 1 to 2 mol % and having an ionic carboxyl or sulfonic acid group of which the ionic group content satisfies the above-mentioned formula (2) (as in Examples 1, 2, 5, 6, 7, 10, 11, 14, 16, 17) give ceramic green sheets having a much better surface condition and having a much higher mechanical strength.

Example 26

Production of Polyvinyl Acetal:

540 g of PVA (PVA-18a) was put into 6600 ml of water, dissolved therein under heat up to 90° C. with stirring, and then cooled to 30° C. 287 g of butylaldehyde was added to it and dispersed, and then cooled to 0° C. 1090 ml of 20% hydrochloric acid solution was added to it to start the reaction of the compounds. After the addition of hydrochloric acid, the reaction solution was heated up to 30° C. over a period of 3 hours, and then kept at the temperature for further 2 hours. The granular solid thus deposited was taken out through filtration and well washed with water, and 350 ml of 10% sodium hydroxide solution was added to the resulting suspension of the granular solid to neutralize it. Then, this was again gently heated. Further, this was washed with water to remove the excess alkali, and then the granular solid was dried. Thus obtained, the polyvinyl acetal (VAP-26a) was analyzed, and its data are given in Table 15. The polyvinyl acetal was dried at 90° C. under reduced pressure for 2 days, and subjected to proton NMR with a solvent of DMSO-d6. The ionic group content of the polyvinyl acetal was calculated from the peak (at 2.6 ppm) derived from the methylene bonding to the sulfur atom of the polymer, and it was the same as that of the starting polymer, PVA-18a.

Preparation of Pigment Dispersion:

Some ethanol solutions of polyvinyl acetal (VAP-26a) that differ in the solid concentration of the polymer therein were prepared, and the outflow time of each solution was measured with a 4 mm-DIN cup (DIN53211/23° C.). Of those, 400 g of the ethanol solution of polyvinyl acetal (VAP-26a) of which the polymer concentration was so controlled that the outflow time of the solution could be 20 seconds was selectively produced. 100 g of pigment (Hostaperm Blue B2G) was added to 400 g of the ethanol solution, and the resulting mixture was homogenized, and kneaded with glass beads for 30 minutes with cooling. Then, this was sieved to remove the glass beads to give a pigment dispersion.

Thus obtained, the viscosity of the pigment dispersion and the pigment content thereof were measured according to the methods mentioned below. The data are given in Table 15.

Viscosity of Pigment Dispersion (cup outflow time):

The outflow time of the pigment dispersion from a 6-mm DIN cup (DIN53211/23° C.) is measured.

Pigment Content of Pigment Dispersion:

The pigment dispersion that was used for measuring its cup outflow time was diluted with ethanol so that its Hoeppler viscosity at 23° C. could be 10 mPa·s, and the pigment content of the dispersion was calculated. The pigment content of each sample analyzed is in terms of the ratio (times) based on the pigment content, 1.0, of the pigment dispersion of Comparative Example 15.

Examples 27 to 40

In the same manner as in Example 26, polyvinyl acetals were produced from PVAs having a degree of polymerization of 200 as in Table 6 (PVA-18a and PVA-22a to PVA-33a). Next, also in the same manner as in Example 26, pigment dispersions were prepared with these polyvinyl acetals, and analyzed for the viscosity and the pigment content thereof. The data are given in Table 15.

Comparative Examples 15 to 20

In the same manner as in Example 26, polyvinyl acetals were produced from PVAs having a degree of polymerization of 200 as in Table 6 and Table 8 (PVA-18a, PVA-11b and PVA-15b to PVA-17b). Next, also in the same manner as in Example 26, pigment dispersions were prepared with these polyvinyl acetals, and analyzed for the viscosity and the pigment content thereof. The data are given in Table 15.

TABLE 15

| | PVA Used | Aldehyde Used | Amount of Aldehyde Added (g) | Degree of Acetalization (mol %) | Polyvinyl Acetal | Outflow Time (sec) | Pigment Content (time)[1] |
|---|---|---|---|---|---|---|---|
| Example 26 | PVA-18a | butylaldehyde | 287 | 68.5 | VAP-26a | 10 | 3.2 |
| Example 27 | PVA-22a | butylaldehyde | 284 | 67.7 | VAP-27a | 11 | 3.1 |
| Example 28 | PVA-23a | butylaldehyde | 278 | 66.3 | VAP-28a | 16 | 1.4 |
| Example 29 | PVA-24a | butylaldehyde | 299 | 71.4 | VAP-29a | 17 | 1.3 |
| Example 30 | PVA-25a | butylaldehyde | 274 | 65.3 | VAP-30a | 13 | 2.4 |
| Example 31 | PVA-26a | butylaldehyde | 271 | 64.8 | VAP-31a | 13 | 2.2 |
| Example 32 | PVA-27a | butylaldehyde | 287 | 68.5 | VAP-32a | 13 | 2.1 |
| Example 33 | PVA-18a | propionaldehyde | 281 | 67.1 | VAP-33a | 16 | 1.5 |
| Example 34 | PVA-18a | butylaldehyde | 237 | 56.5 | VAP-34a | 13 | 2.1 |
| Example 35 | PVA-28a | butylaldehyde | 313 | 74.8 | VAP-35a | 14 | 2.3 |
| Example 36 | PVA-29a | butylaldehyde | 304 | 72.5 | VAP-36a | 13 | 2.4 |
| Example 37 | PVA-30a | butylaldehyde | 286 | 68.2 | VAP-37a | 16 | 1.4 |
| Example 38 | PVA-31a | butylaldehyde | 291 | 69.5 | VAP-38a | 18 | 1.4 |
| Example 39 | PVA-32a | butylaldehyde | 288 | 68.8 | VAP-39a | 13 | 2.4 |
| Example 40 | PVA-33a | butylaldehyde | 288 | 68.7 | VAP-40a | 16 | 1.4 |
| Comp. Ex. 15 | PVA-11b | butylaldehyde | 289 | 68.9 | VAP-15b | 25 | 1.0 |
| Comp. Ex. 16 | PVA-15b | butylaldehyde | 288 | 68.8 | VAP-16b | 22 | 1.0 |
| Comp. Ex. 17 | PVA-11b | propionaldehyde | 283 | 67.5 | VAP-17b | 28 | 0.8 |
| Comp. Ex. 18 | PVA-18a | butylaldehyde | 173 | 41.2 | VAP-18b | 26 | 0.9 |
| Comp. Ex. 19 | PVA-16b | butylaldehyde | 294 | 70.2 | VAP-19b | 20 | 1.1 |
| Comp. Ex. 20 | PVA-17b | butylaldehyde | 291 | 69.4 | VAP-20b | 20 | 1.1 |

[1])Ratio (times) based on the pigment content, 1.0 in Comparative Example 15

Example 41 and Comparative Examples 21, 22

In the same manner as in Example 26, polyvinyl acetals were produced from PVAs having a degree of polymerization of 500 as in Table 6 and Table 8 (PVA-19a, PVA-12b and PVA-18b). Next, also in the same manner as in Example 26, pigment dispersions were prepared with these polyvinyl acetals, and analyzed for the viscosity and the pigment content thereof. The data are given in Table 16.

Examples 42 to 46 and Comparative Example 23

Polyvinyl acetals were produced in the same manner as in Example 26, for which, however, two were selected from PVAs (PVA-20a, PVA-21a, PVA-34a, PVA-13b and PVA-14b) having a degree of polymerization of 80 or 300 shown in Table 6 and Table 8 and these were mixed so that the resulting mixture could have a mean degree of polymerization of 250. Also in the same manner as in Example 26, pigment dispersions were prepared with these polyvinyl acetals, and analyzed for the viscosity and the pigment content thereof. The data are given in Table 17.

TABLE 16

| | PVA Used | Aldehyde Used | Amount of Aldehyde Added (g) | Degree of Acetalization (mol %) | Polyvinyl Acetal | Outflow Time (sec) | Pigment Content (time)[1] |
|---|---|---|---|---|---|---|---|
| Example 41 | PVA-19a | butylaldehyde | 279 | 66.6 | VAP-41a | 18 | 2.9 |
| Comp. Ex. 21 | PVA-12b | butylaldehyde | 278 | 66.3 | VAP-21b | 35 | 1.0 |
| Comp. Ex. 22 | PVA-18b | butylaldehyde | 287 | 68.4 | VAP-22b | 30 | 1.1 |

[1])Ratio (times) based on the pigment content, 1.0 in Comparative Example 21.

TABLE 17

| | PVA Used | Aldehyde Used | Amount of Aldehyde Added (g) | Degree of Acetalization (mol %) | Polyvinyl Acetal | Outflow Time (sec) | Pigment Content (time)[1] |
|---|---|---|---|---|---|---|---|
| Example 42 | PVA-20a/PVA-21a = 19/81 | butylaldehyde | 287 | 68.5 | VAP-42a | 12 | 3.1 |
| Example 43 | PVA-20a/PVA-13b = 19/81 | butylaldehyde | 283 | 67.5 | VAP-43a | 14 | 2.2 |
| Example 44 | PVA-21a/PVA-14b = 81/19 | butylaldehyde | 286 | 68.2 | VAP-44a | 13 | 2.7 |
| Example 45 | PVA-34a/PVA-21a = 19/81 | butylaldehyde | 287 | 68.5 | VAP-45a | 20 | 1.4 |
| Example 46 | PVA-34a/PVA-13b = 19/81 | butylaldehyde | 283 | 67.5 | VAP-46a | 20 | 1.4 |
| Comp. Ex. 23 | PVA-13b/PVA-14b = 81/19 | butylaldehyde | 288 | 68.7 | VAP-23b | 28 | 1.0 |

[1]Ratio (times) based on the pigment content, 1.0 in Comparative Example 23.

From the data in Table 15 to Table 17, it is understood that the pigment dispersions, in which is used the polyvinyl acetal of the invention for the binder for ink or paint (as in Examples 26 to 46), all have a lower viscosity and have a higher pigment content than those in the pigment dispersions that comprise a binder of polyvinyl acetal not falling within the scope of the invention (as in Comparative Examples 15 to 23).

In particular, the polyvinyl butyrals having a degree of butyralization of from 60 to 80 mol % and obtained through butyralization of polyvinyl alcohol having a 1,2-glycol content of from 1 to 2 mol % and having an ionic carboxyl or sulfonic acid group of which the ionic group content satisfies the above-mentioned formula (2) (as in Examples 26, 27, 30, 31, 32, 35, 36, 39, 41) are more effective for further reducing the viscosity of the pigment dispersions and for increasing the pigment content thereof.

When the polyvinyl acetal of the invention that is obtained through acetalization of polyvinyl alcohol having a specific amount of an ionic group at the terminal thereof via a sulfido bond is used for binders for ceramic forming, then the ceramic green sheets produced have a more homogeneous surface condition and have a higher mechanical strength than those of the sheets obtained by the use of an ordinary polyvinyl acetal for binder, and the ceramic green sheets thus obtained according to the invention can be more thinned. Since such thinned ceramic green sheets are especially useful for small-sized and large-capacity electric and electronic parts and members that are much desired these days. Accordingly, the binder for ceramic forming of the invention is especially useful in fabricating small-sized and large-capacity ceramic monolithic capacitors and in fabricating ceramic boards for electronic circuits for IC chips, etc.

When the polyvinyl acetal of the invention is used for binders for ink or paint, it gives ink and paint having a low solution viscosity and a high solid content (high pigment content). The ink or paint thus produced may have an increased pigment content when it has a desired viscosity for printing or painting. Therefore, even when the film formed by printing or painting is thin, its color intensity is high. Having the advantage, therefore, the ink is especially favorable to high-speed printers.

Although the present invention has been fully described in connection with the preferred embodiments thereof, those skilled in the art will readily conceive of numerous changes and modifications within the framework of obviousness upon the reading of the specification herein presented of the present invention. Accordingly, such changes and modifications are, unless they depart from the scope of the present invention as delivered from the claimed annexed thereto, to be construed as included herein.

What is claimed is:

1. A polyvinyl acetal having a degree of acetalization of from 45 to 80 mol %, which is obtained through acetalization of a polyvinyl alcohol that has a degree of polymerization of from 30 to 1000 and a degree of hydrolysis of from 80.0 to 99.99 mol % and is terminated with an ionic group via a sulfido bond while satisfying the requirement of the following formula (1):

$$0.15 \leq \text{content} \leq 218.3 \times P^{-1.046} \tag{1}$$

wherein the content means the content of the ionic group bonded to the polyvinyl alcohol via a sulfido bond (mol %); and P indicates the degree of polymerization of the polyvinyl alcohol.

2. The polyvinyl acetal as claimed in claim 1, for which the polyvinyl alcohol has a 1,2-glycol bond content of from 1 to 2 mol % and satisfies the following formula (2):

$$0.15 \leq \text{content} \leq -0.0606 \times Y + 2.3049 \tag{2}$$

wherein the content means the content (mol %) of the ionic group bonded to the polyvinyl alcohol via a sulfido bond; and Y indicates a 1,2-glycol bond content of the polyvinyl alcohol.

3. The polyvinyl acetal as claimed in claim 1, wherein the ionic group is at least one selected from a carboxyl group, a carboxylate salt, a sulfonic acid group and a sulfonate salt.

4. The polyvinyl acetal as claimed in claim 1, which is obtained through butyralization of a polyvinyl alcohol and of which the degree of butyralization is from 60 to 80 mol %.

5. A binder for ceramic molding, which comprises, as the essential ingredient thereof, the polyvinyl acetal of claim 1.

6. A ceramic green sheet fabricated by the use of the binder for ceramic forming of claim 5.

7. A binder for ink or paint, which comprises, as the essential ingredient thereof, the polyvinyl acetal of claim 1.

8. Ink or paint that contains from 1 to 35% by weight of the binder for ink or paint of claim 7.

* * * * *